United States Patent [19]

Miyakoshi et al.

[11] 4,334,279
[45] Jun. 8, 1982

[54] DISPLAY DEVICE FOR ELECTRONIC CALCULATORS OR THE LIKE

[75] Inventors: Kazumitsu Miyakoshi; Koji Maekawa, both of Yamatokoriyama, Japan

[73] Assignee: Sharp Kabushiki Kaisha, Tokyo, Japan

[21] Appl. No.: 138,910

[22] Filed: Apr. 11, 1980

[30] Foreign Application Priority Data

Apr. 11, 1979 [JP] Japan .................................. 54-44611
Apr. 12, 1979 [JP] Japan .................................. 54-45858
Apr. 16, 1979 [JP] Japan .................................. 54-47119

[51] Int. Cl.³ .......................... G06F 15/02; G06F 3/14
[52] U.S. Cl. ..................................... 364/710; 364/709
[58] Field of Search ................. 364/200, 709, 710, 900

[56] References Cited

U.S. PATENT DOCUMENTS

3,976,975  8/1976  Cochran ............................... 364/900
3,979,057  9/1976  Katz et al. ....................... 364/443 X
3,979,058  9/1976  Katz et al. ....................... 364/900 X
4,152,769  5/1979  Olander, Jr. et al. ................ 364/709
4,172,285 10/1979  Yoshida et al. ................. 364/710 X Primary Examiner—Jerry Smith
Attorney, Agent, or Firm—Birch, Stewart, Kolasch & Birch

[57] ABSTRACT

A display circuit adapted for use in an electronic calculator comprises a circuit for enabling communication between the calculator and the operator to inquire as to the value of one or more variables and a circuit for pointing out the kind of a variable which is presently subject to inquiry and input data items entered by the operator. In another form of the present invention, the display circuit comprises a circuit for detecting a space or separable portion between two algebraic expressions, a circuit for terminating the indication just before the position of the space, and a circuit for subsequently initiating indications of items following the space from the top digit of a display. In a further preferred form of the present invention, the display circuit comprises a circuit for detecting a separation mark between two equations, a counter for counting the serial number of the separation mark, a circuit for showing the serial number of the separation mark in addition to the results of the calculation obtained by one of the equations.

12 Claims, 13 Drawing Figures

| | KEY OPERATION | A | B |
|---|---|---|---|
| ① | [SIN][1][2][.][3][+] | SIN12.3+ | SIN12.3+ |
| ② | [COS] | 12.3+COS | 12.3+COS |
| ③ | [3][4][-][TAN][5][6][◣] | 4−TAN56◣ | 4−TAN56◣ |
| ④ | [5][×][3][.][4] | 5×3.4 | 5×3.4 |
| ⑤ | [PB] | SIN12.3+ | ↓SIN12.3+ |
| ⑥ | [PB] | COS34− | ↓COS34− |
| ⑦ | [PB] | TAN56◣5× | ↓TAN56◣ |
| ⑧ | [PB] | 3.4 | 5×3.4 |

FIG. 6

| STEP NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| MEMORY CONTENTS | SIN | 1 | 2 | . | 3 | + | COS | 3 | 4 | − | TAN | 5 | 6 | ◣ | 5 | × | 3 | . | 4 | | | |

FIG. 7

| 1 | 2 | 3 | 4 | 5 | 6 | 7 | 8 | 9 | 10 | 11 | 12 | 13 | 14 | 15 | 16 | 17 |
|---|---|---|---|---|---|---|---|---|----|----|----|----|----|----|----|----|
| A | × | B | + | C | = | , | ( | B | -  | D  | )  | ÷  | 2  | =  | ,  |    |

DISPLAY DEVICE FOR ELECTRONIC CALCULATORS OR THE LIKE

BACKGROUND OF THE INVENTION

This invention relates to a display device for use in an electronic apparatus such as an electronic calculator, and more particularly a new and effective display device for displaying data derived from an electronic calculator.

Recently, improved types of display devices of electronic calculators have evolved indicating calculation equations to be performed in the calculators. In those types of display devices, it is further desired that they be improved so as to become suitable for facilitating each entry operation of a plurality kinds of input data items, and for indicating a considerably long train of data such as a calculation equation.

SUMMARY OF THE INVENTION

Accordingly, it is an object of the present invention to provide an improved display device adapted for use in an electronic calculator.

It is a further object of the present invention to provide an improved display device adapted for use in an electronic calculator, which displays a calculation equation processed in the calculator and, in addition, a specific kind of information concerning the calculation equation.

It is a further object of the present invention to provide an improved display device suitable for an electronic calculator, which instructs the operator to subsequently enter a specific kind of input data item used in calculating according to an equation stored in the calculator.

It is a further object of the present invention to provide an improved display device suitable for an electronic calculator, which displays a long train of data constituting an equation by dividing it into some parts.

It is a still further object of the present invention to provide an improved display device suitable for an electronic calculator, which displays the results of calculations by a certain number of equations together with the serial number of a particular equation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a display circuit adapted to an electronic calculator comprises a circuit for enabling communication between the calculator and the operator to inquire as to the value of one or more variables and a circuit for pointing out the kind of a variable which is presently subject to inquiry and input data items entered by the operator. In another form of the present invention, the display circuit comprises a circuit for detecting a space or separable portion between two algebraic expressions, a circuit for terminating the indication just before the position of the space, and a circuit for initiating the next indication equivalent to items next to the space from the top digit of a display.

In a further preferred form of the present invention, the display circuit comprises a circuit for detecting a separation mark between two equations, a counter for counting the serial number of the separation mark, and a circuit for showing the serial number of the separation mark in addition to the results of calculation obtained by one of the equations.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIG. 6 represents relations between key operation using the keyboard configuration of FIG. 4 and a display state by the display circuit of FIG. 5;

FIG. 7 represents details of an equation stored in the display circuit of FIG. 5;

DESCRIPTION OF THE INVENTION

A specific form of display device according to the present invention is firstly described with reference to FIGS. 1 through 3, wherein the display device is adapted to indicate the name or kind of variable input or input data items in addition to the value of the variable or the indicia of the input data items.

Figure 1:
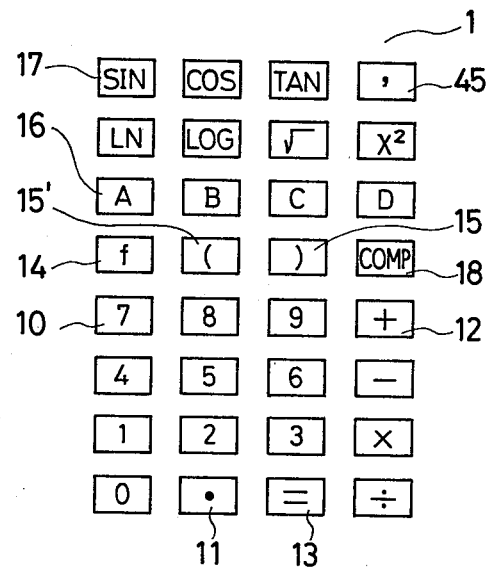
FIG. 1 is a plan view of one form of keyboard configuration for use with the present invention.

Now referring to FIG. 1, a keyboard 1 to be typically employed in an electronic calculator comprises ten numeral keys 10 allotted for decimal numerals 0, 1, 2, 3, ... 9, a decimal point key 11 allotted for a decimal point, and first function keys 12 for specifying four arithmetic operations of addition, subtraction, multiplication and division. The numeral keys 10 are used to enter the ordinary numerical value. In the embodiment shown, the numeral keys have been denoted by the respective numeral indications of 0, 1, 2, 3, ... 9, the decimal point key has been denoted by the ordinary decimal point mark ".", and four arithmetic operation keys for addition, subtraction, multiplication and division have been denoted by the symbols "+", "−", "×" and "÷".

The keyboard shown further comprises several additional keys uniquely assigned for the present invention. Such additional keys include an equal key 13 marked "=" for enabling the separation between a variable identifying part and an equation indicia, and for initiating a calculation, a variable selecting key 14 marked "f" for enabling the selection of a specific value of a variable, two bracket indicating keys 15 and 15' for enabling the indication of respective parts of a bracket, four variable selecting keys 16 marked "A", "B", "C" and "D" for enabling an entry of variable data, a plurality of second function keys 17 marked "SIN", "COS", "TAN", "LN", "LOG", "√‾", and "X²" for specifying considerably complicated arithmetic operations as marked, a space key 45 marked "," for enabling the separation between two or more kinds of variables, and an instruction key 18 marked "COMP" for enabling the command to communicate with the operator by the calculator.

The two bracket indicating keys 15 and 15' are actuated for providing the bracket indication used in specifying the variable. Altenatively, they are actuated for providing the bracket indication used in calculating.

Figure 2:
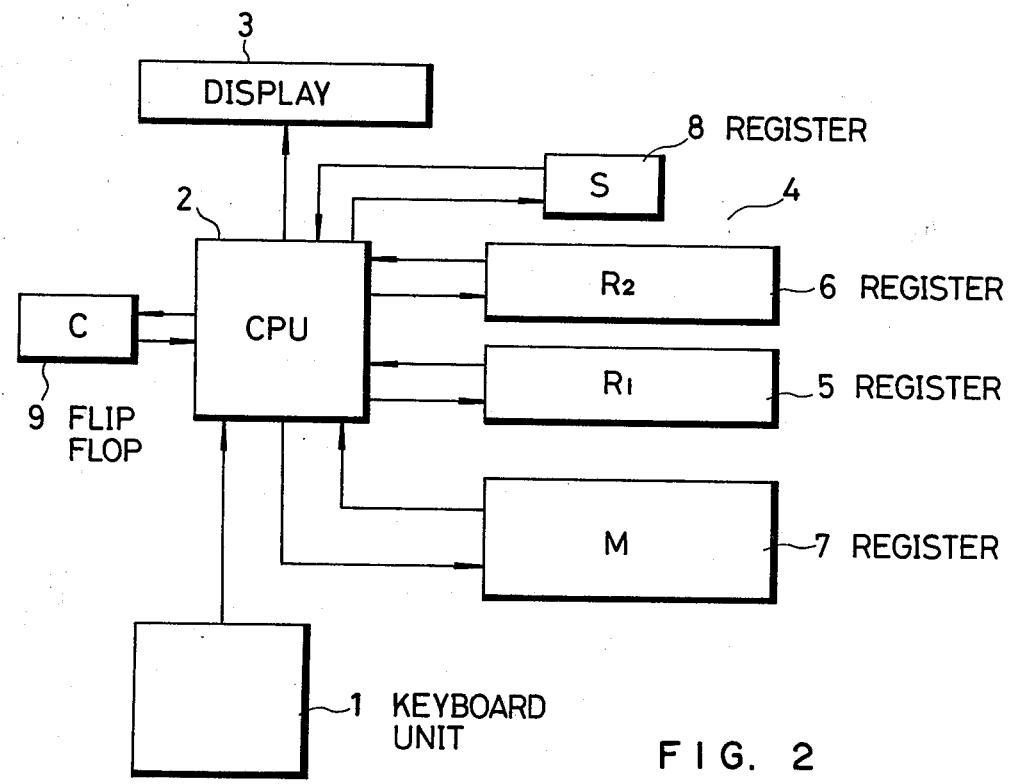
FIG. 2 is a block diagram of a form of a display circuit according to the present invention.

FIG. 2 shows a specific form of display circuit according to the present invention. The display circuit comprises a keyboard unit 1 related to the keyboard 1 shown in FIG. 1, a central processing unit (CPU) 2, a display 3, a circuit 4 comprising four registers 5, 6, 7 and 8, and a C flip flop 9.

The R1 register 5 is provided for storing an algebraic equation. The R2 register 6 is provided for storing the names of variables, and algebraic expressions which are entered. The M register 7 functions to memorize values of variables. The S register 8 acts to store the number of steps. The C flip flop 9 serves to store conditions where the electronic calculator is instructing the operator to enter a value of a particular variable. The display 3 may be composed of any desired display element such as a light emitting diode (LED), a liquid crystal display and the like.

Figure 3:
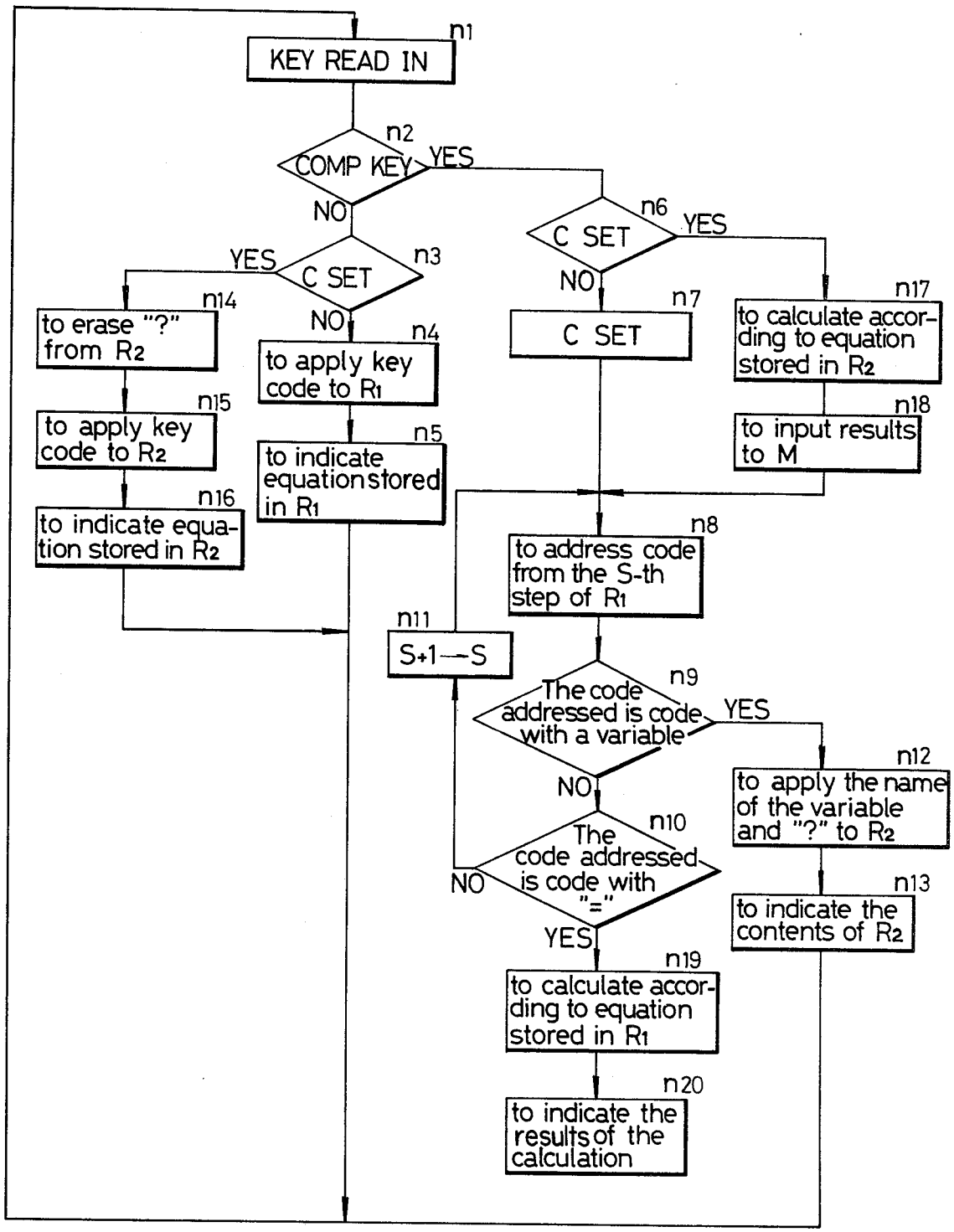
FIG. 3 is a flow chart of the displaying operation by the display circuit shown in FIG. 2.

FIG. 3 shows a flow chart representing operation by the display circuit of FIG. 2 to enable indications summarized in the following table by key operations specified therein.

TABLE 1

| Key Operation | Indication |
|---|---|
| ① [f][(][A][,][B][,][C][)][=] | f(A,B,C) = |
| ② [√‾][(][A][x²][+][B][x²][)][+][C] | f(A,B,C) = √(A² + B²) + C |
| ③ [COMP] | A = ? |
| ④ [2][×][SIN][3][0] | A = 2 × SIN 30 |
| ⑤ [COMP] | B = ? |
| ⑥ [2][×][COS][3][0] | B = 2 × COS 30 |
| ⑦ [COMP] | C = ? |
| ⑧ [1][.][5] | C = 1.5 |
| ⑨ [COMP] | 3.5 |

Until the instruction key "COMP" 18 is operated, as shown in the flow chart of FIG. 3, a desired step cycle of n1→n2→n3→n4→n5→n1→ is repeated so that key codes entered are stored in the R1 register 5 and indicated in the display 3. In step ① of Table 1, variables are selected which are provided within the bracket. When "f(A, B, C)=" is entered in step ①, "A", "B" and "C" are selected as variables. Step ② of Table 1 is executed to enter an algebraic expression according to which calculation is to be effected. The algebraic expression contains the variables "A", "B" and "C" specified in step ①. Steps ① and ② are performed until the actuation of the instruction key "COMP" 18. The respective key codes are applied to and stored in the R1 register 5. Simultaneously, they are indicated in the display 3.

The instruction key "COMP" 18 is operated in step ③ of Table 1 so that steps n1→n2→n6→n7 of FIG. 3 are executed. The C flip flop 9 is set so that the electronic calculator is operated to keep requesting the operator to enter a value of a particular variable, namely, a communication mode with the operator is established. The following steps are directed to the communications between the electronic calculator and the operator.

Communication between the electronic calculator and the operator is effected as follows:

A step cycle of n8→n9→n10→n11→n8→ is repeated wherein the algebraic expression stored in the R1 register 5 is subsequently applied to the CPU 2 from the first step for reading-in purposes. The CPU 2 performs calculation according to the algebraical expression. The R1 register stores the algebraic equation which is identical to the indication in step ② of Table 1. When a certain kind of variable, "A" is read in, the program selects from n9 to n12→n13, so that a value of the variable "A" is requested from the operator by the electronic calculator. The name of the variable, e.g., "A" and the question mark "?" are stored in the R2 register 6 and indicated in the display 3.

Step ④ of Table 1 is executed with the object that a value of the variable or an algebraic expression is by the operator entered in response to the request by the calculator. In the flow chart of FIG. 3, the program selects from n1→n2→n3 to N14→n15→n16. After only the question mark "?" is canceled from the R2 register 6, the key codes are subsequently stored in it for replacement purposes. The indicias of the key codes are indicated in the display 3. The operator is informed of the name or kind of the variable in addition to the value or the algebraic expression of the variable by the display 3. This specifies to which kind of variable that the value or the algebraic expression of the variable entered by the operator is related.

When the instruction key "COMP" 18 is actuated in step ⑤ of Table 1 representing that the introduction of the value or the algebraic expression of the variable is completed, the program selects steps from n1→n2 to n6 and then n17→n18, wherein the algebraic expression stored in the R2 register 6 is calculated and the results by the calculation is stored in a memory cell for the numerical value with respect to the variable "A", the memory cell being within the M register 7. Alternatively, when the input data items stored in the R2 register 6 are numerical values, the numerical values are directly applied to and stored in the memory cell as such.

A step cycle of n8→n9→n10→n11→n8→ is necessarily repeated, so that the calculator is placed to request the operator to enter a value of a particular variable, e.g., "B" by the communication with the operator.

Step ⑥ of Table 1 is executed so that a value or algebraic expression of the variable "B" is applied. Step ⑦ is operated so that the calculation by the variable "B" is performed and the results are stored, and then the value of a next variable "C" is requested by the calculator. Step ⑧ is executed so that the value or algebraic expression of the variable "C" is entered. In steps ⑥ and ⑧, the display 3 indicates the name or kind of the variable in addition to the value or algebraic expressions of the variable. This ensures the proper introduction of input data items.

After the introduction of the value or algebraic expression of the variable "C", the instruction key "COMP" 18 is operated in step 9 of Table 1. The program chooses steps of n17→n18, where the calculation by the variable "C" is performed and the result is stored. By steps of n8→n9→n10→n11→n8→..., a code of "=" is read in for the purpose of separating variable selecting parts and the algebraic expression. The entry of the code "=" represents that the communication mode between the electronic calculator and the operator has been terminated. The program selects the steps from n10 to n19→n20 where the algebraic equation is finally performed. The algebraic equation, "$\sqrt{(A^2+B^2)}+C$" stored in the R1 register 5 is applied to the CPU 2 for reading out purposes so that the calculation based upon the equation is produced with reference to the values of the variables "A", "B", and "C" memorized in the M register 7 and then the result is indicated in the display 3.

Another specific form of display device according to the present invention is described with reference to FIGS. 4 through 8(C), wherein the display device is adapted to firstly indicate a part of an algebraic equation, the part being selected by a separable part within the equation, and the remaining part is indicated secondarily.

Figure 4:
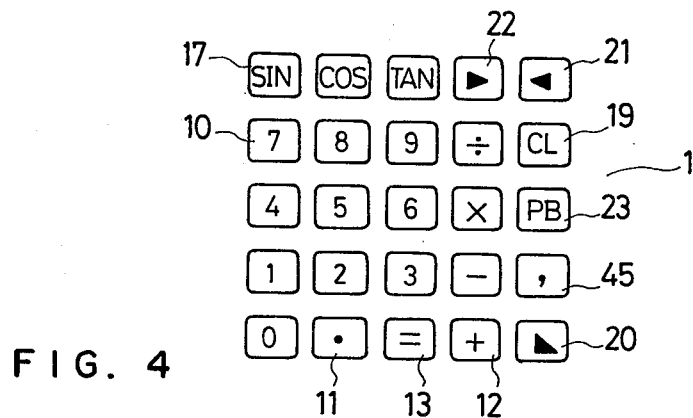
FIG. 4 is a plan view of another form of a keyboard configuration for use with the present invention.

FIG. 4 shows another specific form of the keyboard 1 according to the present invention. Like elements corresponding to those of FIG. 1 are indicated by like numerals. Additionally, a clear key 19 marked "CL" is provided for canceling algebraic expressions and arithmetic information, a program separation key 20 is employed to separate the program as desired, a step down key 21 is operated to cause a step down operation, a step up key 22 is used to cause a step up operation, and an indication key 23 marked "PB" is operated to cause the algebraic expression stored to be indicated subsequently in the display. Both of the step down key 21 and the step up key 22 are used to enable the change of letters or symbols which are indicated and specified by a cursor for use with the display.

Figure 5:
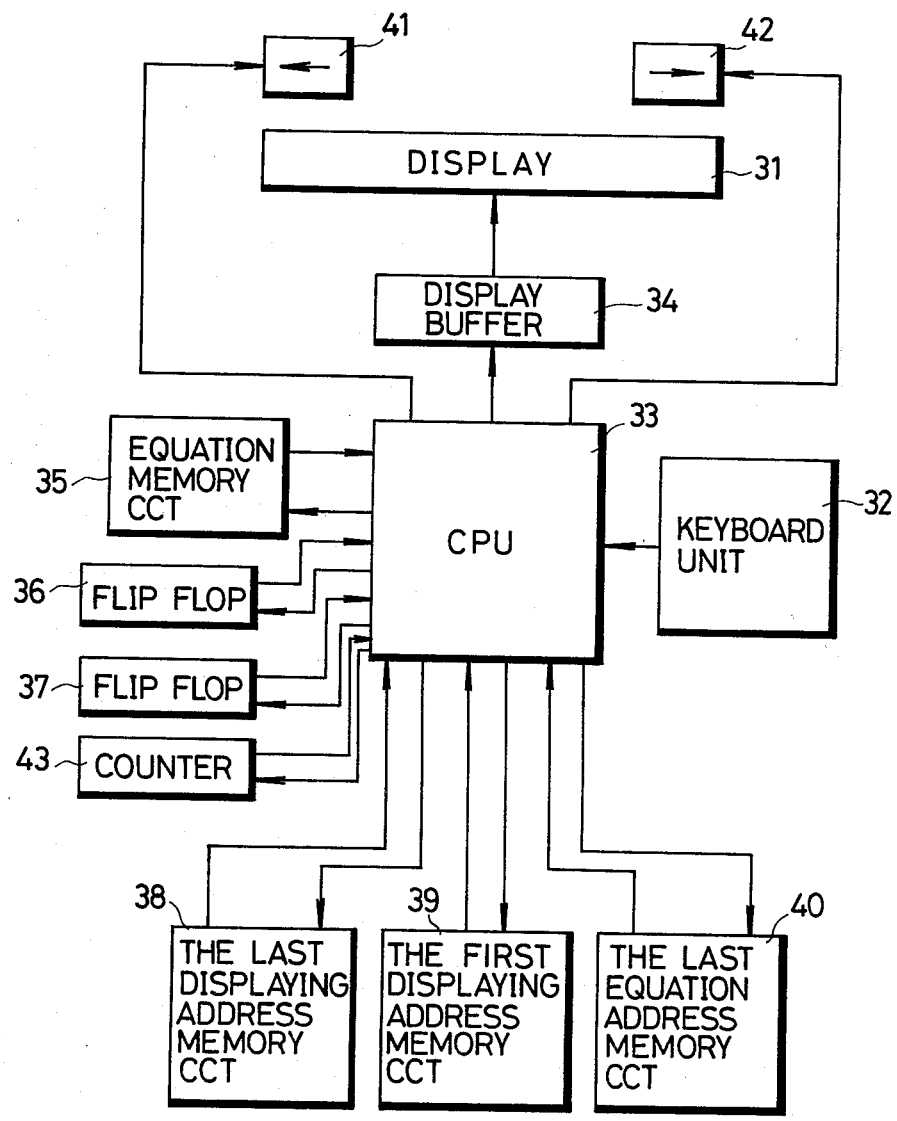
FIG. 5 shows a block diagram of another form of a display circuit according to the present invention.

FIG. 5 shows a block diagram of another form of display circuit in accordance with the present invention. The display circuit comprises a display 31, a keyboard unit 32 related to the keyboard 1 of FIG. 4, a CPU 33, a display buffer 34, an equation memory circuit 35, two flip flops 36 and 37, the last displaying address memory circuit 38, the first displaying address memory circuit 39, the last equation address memory circuit 40, two symbol elements 41 and 42, and a counter 43.

The CPU 33 is responsive to the actuation of key switches of the keyboard unit 32 to control circuit elements of the display circuit of FIG. 5. The display buffer 34 receives display information developed from the CPU 33 and sends it to the display 31. The display 31 is a conventional type of display as in the display 3 of FIG. 2. The equation memory circuit 35 stores any algebraic equation, which is entered by the keyboard unit 32, under the control by the CPU 33.

The first flip flop 36 is set when an algebraic expression is indicated in the display 34 in response to the actuation of the indication key 23. The second flip flop 37 is set when the results of the calculation are indicated in the display 34. The last displaying address memory circuit 38 stores an address of the last step of the algebraic expression indicated in the display 31. The first displaying address memory circuit 39 memorizes an address of the first step of the algebraic expression indicated in the display 31. The last equation address memory circuit 40 memorizes the last step of the algebraic equation presently stored in the equation memory circuit 35, with the object that the number of the total steps of the algebraic equation is memorized.

The two symbol elements 41 and 42 represent whether or not there is present any algebraic equation adjacent to the algebraic equation indicated in the display 34, in particular, in the forward part and the backward part of the algebraic equation. Both symbol elements 41 and 42 are disposed within the display 31, in actual form. The illumination of the first symbol element 41 represents that there is present at least one algebraic equation and the forward part of the algebraic equation is indicated in the display 31. Similarly, the illumination of the second symbol element 42 indicates that there is at least one algebraic equation and the backward part of the algebraic equation indicated. The counter 43 counts the number of letters to be indicated in the display 31, with the object that the number of items of display information developed from the CPU 33 to the display 31 for displaying purposes is within the number of digits which are available in the display 31.

Figure 8A:
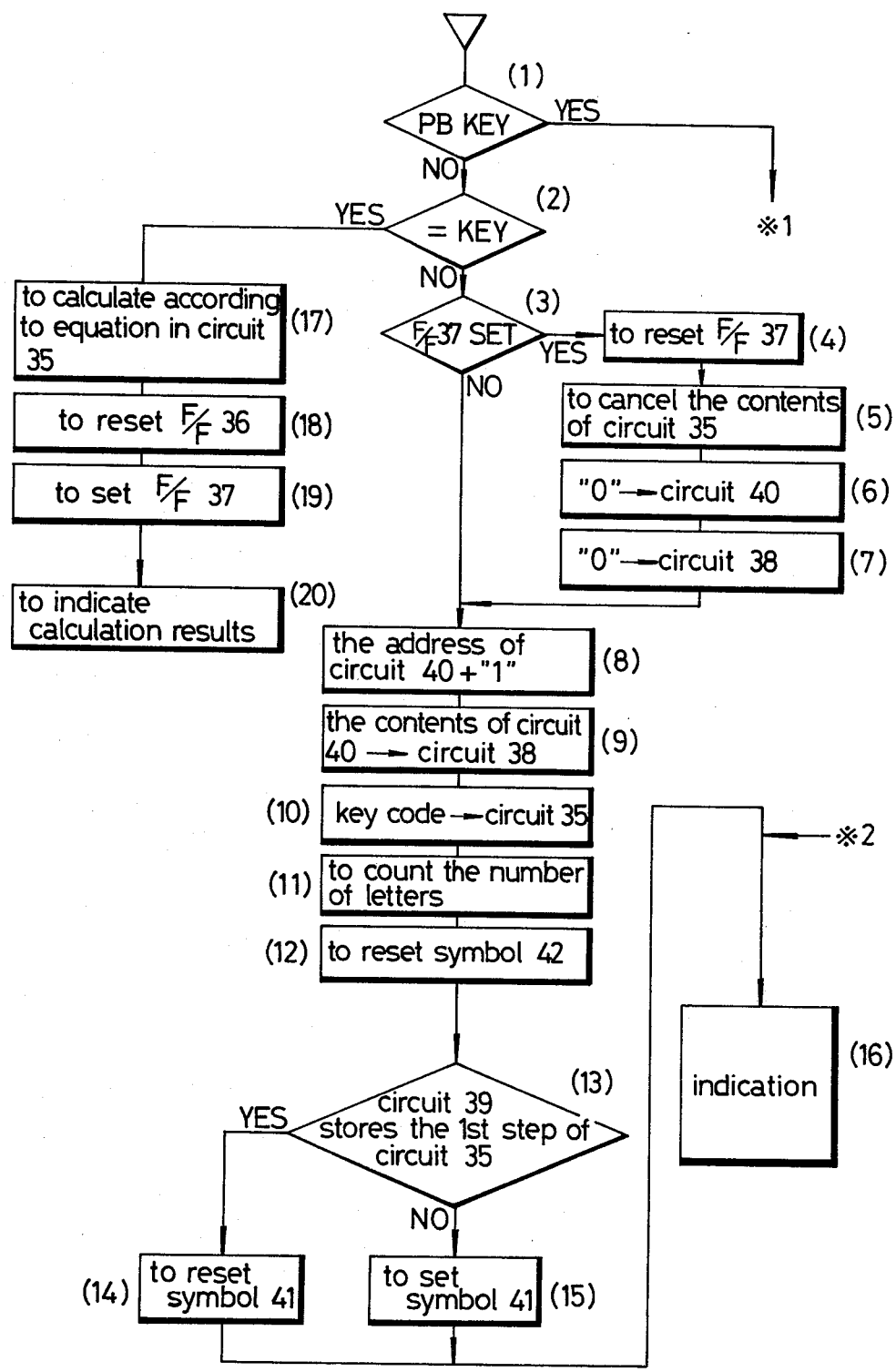
FIGS. 8(A), 8(B) and 8(C) are flow charts of the displaying operation by the display circuit of FIG. 5.
Figure 8B:
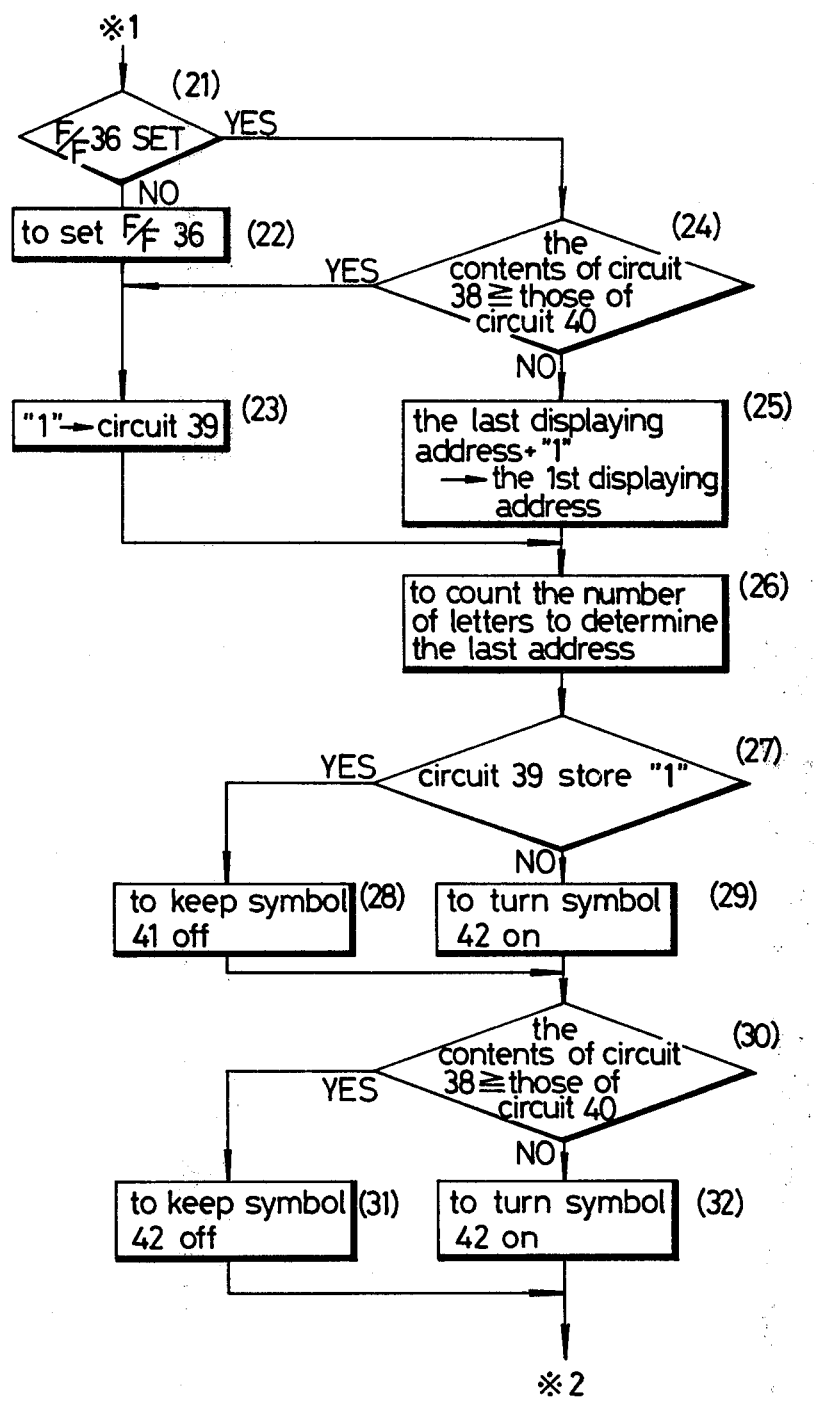

Operation of the display circuit of FIG. 5 will be described with reference to the relations between key operation and the indication as shown in FIG. 6 and the contents of the algebraic equation stored as shown in FIG. 7. FIGS. 8(A) and 8(B) show a flow chart representing such operation of the display circuit.

In FIG. 6, numerals ① through ⑧ are concerned with steps in which the key switches as specified are actuated, a numeral "A" is related to a conventional form of display condition without a program separation function, and a numeral "B" is related to a specific form of display condition in terms of the present invention. Steps ① to ④ are operated so that the key input information is applied while steps ⑤ to ⑧ are operated so that the algebraic equation entered is taken out.

When key input information is entered from the keyboard unit 32 to the CPU 33, it generates key code information corresponding to the key input information, the key code information being applied to and stored in the equation memory circuit 35. The following operation is described with reference to FIGS. 8(A) and 8(B). The CPU 33 determines in step (1) of FIG. 8(A) whether the indication key "PB" is actuated and then in step (2) whether the equal key "=" 13 is operated. If the two kinds of determination in steps (1) and (2) are denied by the actuation of the key switches in steps ① through ④, the program proceeds to step (3). In step (3), the set and reset conditions of the flip flop 37 are detected. The flip flop 37 is set under the condition that the results of the calculation are enabled in the display 31. It is reset in other cases.

When the results of the calculation are indicated prior to the actuation of the keyboard, the determination by step (3) is affirmed so that the flip flop 37 is turned reset in the following step (4). Subsequently, in step (5), the contents of the equation memory circuit 35 are canceled, in step (6), zero information is applied to the last equation address memory circuit 40, and in step (7), zero information is entered into the last displaying address memory circuit 38.

Step (8) is operated so that "1" is applied to the last equation address memory circuit 40. The contents of the circuit 40 are transferred to the last displaying address memory circuit 38. The key code information entered is applied to the equation memory circuit 35 for storage in step (10). In step (11), the number of letters to be indicated is counted by the counter 43, with the object that the number of steps inclusive of all the steps presently applied to the last displaying address memory circuit 38 and a certain number of steps once stored in the same is determined for the purpose of indicating both kinds of steps. Step (12) is executed so that the illumination of the second symbol element 42 is placed off or reset.

In step (13), a determination is made whether the first displaying address memory circuit 39 has the address for the first step in the equation memory circuit 35. When "YES" is obtained by step (13), step (14) is selected where the illumination of the first symbol element 41 is placed off or reset. When "NO" is detected, it is placed off or reset in step (15). Step (16) is effected so that the algebraical equation is indicated in the display 31.

When the flip flop 37 is determined to be placed reset by step (3), the program selects step (8) so that the display is continued to be enabled. When the equal key "=" 13 is detected to be operated by step (2), the calculation is performed according to the algebraic equation stored in the equation memory circuit 35 in step (17). Step (18) is executed so that the first flip flop 36 is turned reset. Step (19) is operated where the second flip flop 37 is turned set. The results of the calculation are enabled in step (20).

In steps ⑤ through ⑧ of FIG. 6, the indication key "PB" 23 is actuated. When the actuation of this type of key is detected in step (1) of FIG. 8(A), step (21) of FIG. 8(B) is selected so that the set or reset condition of the flip flop 36 is determined. In step ⑤ of FIG. 6, it is not set and so step (22) of FIG. 8(B) is selected so that it is becomes set. Step (23) is executed so that "1" is applied to the first displaying address memory circuit 39, with the objective that the address of the first step stored in the equation memory circuit 35 is selected. In step (26), the code information is generated from the first address of the circuit 35, whereby the number of letters is counted in order that which number of steps are capable of being indicated is determined. The thus determined step of the last address capable of being indicated is stored in the last displaying address memory circuit 38.

Then step (27) is selected so that the determination is made whether the first symbol element 41 is illuminated. When the first displaying address memory circuit 39 has the information of "1", it represents that there is absent any algebraic equation prior to a particular algebraic equation to be indicated in the display 31. The first symbol element 41 is not illuminated in step (28). Alternatively, when the circuit 39 has "1", it indicates that there is present one algebraic equation prior to the particular algebraic equation. The first symbol element 42 is accordingly illuminated in step (29).

Since the circuit 39 has "1" by the actuation of the key switches in step ⑤ of FIG. 6, the first symbol element 41 is not activated. However, as it does not have "1" by the activation of the key switches in steps ⑥ through ⑧, the first symbol element 41 is shown. Step (30) is then operated in which the contents of the last displaying address memory circuit 38 are compared with those of the last equation address memory circuit 40, to judge operation of the second symbol element 42. When the former is larger than the latter, the second symbol element 42 is placed in inactive conditions in step (31). When the former is smaller than or equal to the latter, it is pointed out in step (32). Therefore, it is enabled or pointed out in steps ⑤ through ⑦ while it is not in step ⑧.

Thereafter, the program chooses step (16) of FIG. 8(A), wherein information corresponding to the address information stored in the first displaying address memory circuit 39 and then the last displaying address memory circuit 38 is entered into the display 31 for displaying purposes.

Figure 8C:
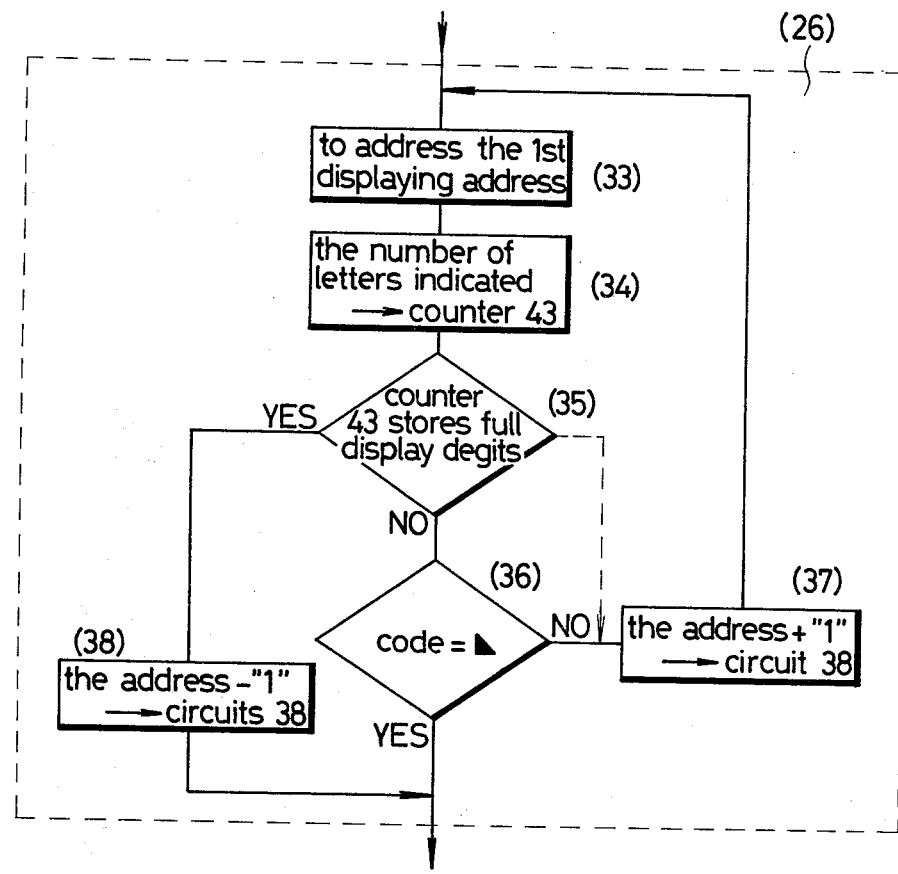

As, in steps ⑥, ⑦ and ⑧ of FIG. 6, the first flip flop 36 is set, step (21) proceeds to step (24). The judgement in step (24) shows that the contents of the last displaying address memory circuit 38 is smaller than those of the last equation address memory circuit 40. It follows that step (25) is selected so that "1" is added to the last displaying address memory circuit 38 and the sum is transferred to the first displaying address memory circuit 39 for storage. Step (26) is then selected. The presence of the illumination of each of the first and the second symbol elements 41 and 42 is further detected as stated above. The display 31 points out the indication shown in FIG. 6. When "YES" is selected in step (24), it represents that the indication of the algebraic equation is completed in response to the actuation of the indication key "PB" 23. In such a case, the program selects step (23), whereby the first step of the indication is initiated. FIG. 8(C) shows a more detailed flow chart of step (26) of the flow chart shown in FIG. 8(B).

It is assumed that the actuation of the key switch in step ⑦ of FIG. 6 is effected. When the indication key "PB" 23 is operated in step ⑦, the answer to the step (21) question of FIG. 8(B) is "YES", and the step (24) question is selected. Since a "NO" answer is obtained with regard to step (24), step (25) is effected so that the addition of one to the last displaying address in the last displaying address memory circuit 38 is applied to the first displaying address memory circuit 39 as the first displaying address. The purpose of this operation is to become ready for the control that the next indication is initiated to be enabled from the step following the end of the algebraical equation which has been pointed out.

Subsequently, step (26) is selected with the objective that the last displaying address is determined. With reference to FIG. 8(C), step (33) is selected to cause access of memory code of the first displaying address fixed in step (25). Step (34) enables the number of letters concerning this memory code, the letters being to be indicated, to be applied to the counter 43. In step (35), a determination is made as to whether the contents of the counter 43 exceeds the available digits in the display 31. Normally, the available or full digits in the display 31 are 8. If the contents of the counter 43 are in excess of the available digits, the address just before a certain number of addresses filling the available digits of the display 31 is transferred to the last displaying address memory circuit 38. If those of the counter 43 are less than the available digits, step (37) is conventionally selected as connected by dotted lines. On the contrary, in the present invention, step (36) is interposed between steps (35) and (37). Step (36) is performed wherein a determination is made whether the code generated is concerned with an equation separation symbol "▶". When the answer to the step (36) question is "YES", the address at this time is supposed to be the last displaying address. When it is "NO", step (37) is selected. In response to the actuation of the indication key "PB" 23 in step ⑧, the address following the code of the equation separation symbol "▲" is supposed to be the first displaying address according to which subsequent indications are enabled. By virtue of the control by the equation separation symbol, the first and the second algebraic equations are separated at the boundary from each other while indicated, as shown in the display from "B" of FIG. 6.

A further specific form of display device according to the present invention is described with reference to FIGS. 9, 10 and 11, wherein the display device comprises a circuit for detecting a separation indicia from one another among a plurality of algebraic equations stored, a circuit for counting the serial number of the separation indicias, and a circuit for showing the serial number of the separation indicias together with the results of calculation which is performed, to identify the results of calculation by the serial number of the separation indicias.

Figure 9:
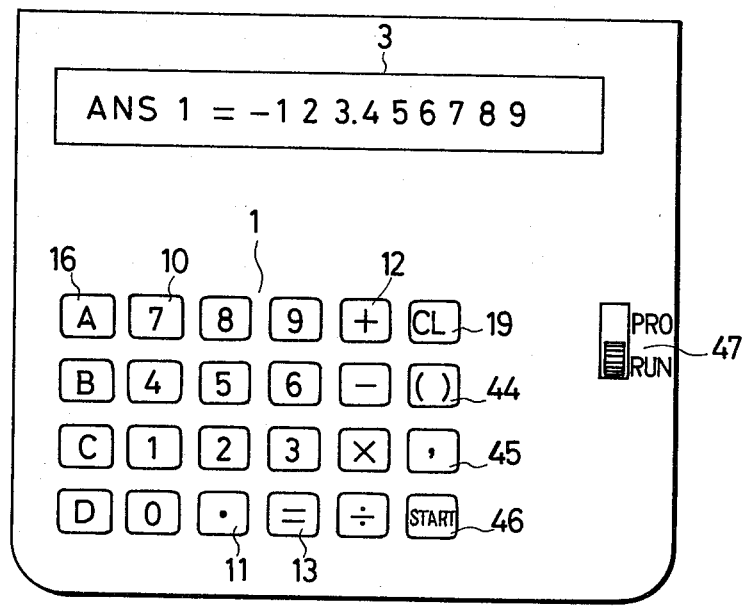
FIG. 9 shows a plan view of a display and still another form of a keyboard configuration for use with the present invention.

FIG. 9 shows a plan view of an electronic calculator according to the further specific form of the present invention. On the top surface of the calculator of FIG. 9, there are provided the keyboard 1, the display, and a mode selection switch 47. Like elements corresponding to those as above described are represented by like numerals.

Like the bracket indicating keys 15 and 15', a single bracket indicating key 44 is provided. An equation separation key 45 is provided for indicating a separation mark "," between two equations. A start key 46 is actuated for initiating to calculate in accordance with a specific algebraical equation stored. The mode selection switch 47 is provided for selecting one from an equation memory mode "PRO" and an equation calculation mode "RUN".

The display 3 as shown in FIG. 9 indicates an example of a display form according to the present invention, wherein the results of calculation marked "1" are pointed out. A symbol "ANS" identifies the data displayed with the results of calculation. The serial number "1" following the symbol "ANS" represents the serial number of the algebraical equation which is stored.

Figures 10, 11:
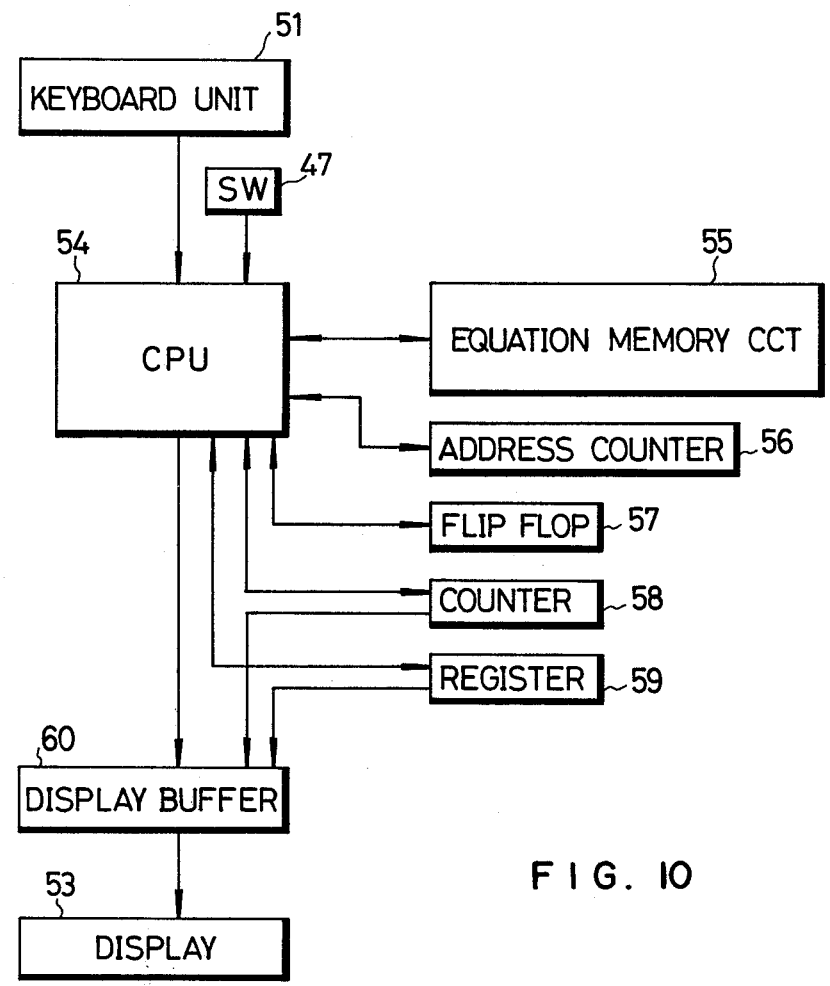
FIG. 10 indicates a block diagram of still another form of a display circuit according to the present invention.
FIG. 11 represents details of an equation memorized by the display circuit of FIG. 10.

FIG. 10 shows a block diagram of the further form of display circuit according to the present invention. The display circuit comprises a keyboard unit 51 corresponding to the keyboard 1 of FIG. 9, the mode selection switch 47, a display 53 related to the display 3 of FIG. 9, a CPU 54, an equation memory circuit 55 for memorizing algebraic equations, an address counter 56 for the equation memory circuit 55, a flip flop 57 which is turned set when calculation is performed, a counter 58 for counting the serial number of the calculations, a register 59 for storing the calculations, and a display buffer 60.

While the mode selection switch 47 is placed in the equation memory mode "PRO", the actuation of the key switches in the keyboard 1 enables key input signals to be entered into the CPU 54. They are converted to key code information for the purpose of being stored in the equation memory circuit 55. The address counter 56 is responsive to each entry of the key input signals to count up. It selects a certain address for the equation memory circuit 55 for storage.

FIG. 11 represents an example of storage format by the circuit 55, wherein upper items indicates respective addresses and lower items indicates the contents of the algebraic equation which is stored.

After the mode selection switch 47 is changed to the equation calculation mode "RUN", the calculation is performed according to the algebraic equation. Firstly, the clear key 19 is operated to place the address counter 56 in an initial state. Then the start key 46 is actuated to initiate calculation. In such a case, the flip flop 57 is set to memorize the conditions of the performance of calculation. At the same time, the counter 58 is canceled to become zero. Subsequent counting up operation of the address counter 56 enables respective codes of the algebraic equation to be generated from the equation memory circuit 55 to the CPU 54. According to the respective codes, the CPU 54 calculates and controls the circuit elements connected thereto. Values of the variables "A", "B", "C" and "D" are entered with the help of the communication between the electronic calculator and the operator as described above while the calculation is effected.

Reading out the separation code indicating the separation mark "," from the equation memory circuit 55 enables the results of the calculation to be pointed out. The results of calculation which are stored in the register 59 are admitted to the display 53 through the display buffer 60 for indication. Simultaneously, the CPU 54 generates a code information representing the symbol "ANS" applied to the display buffer 60. Upon the detection of the separation code indicating the separation mark ",", the counter 58 is counted up by one and the results are introduced to the display buffer 60. Accordingly, the display 3 provides an indication as shown in FIG. 9, regarding the first calculation.

Under these circumstances, the start key 46 is operated so that the second algebraical equation is performed successively. When the separation code is read by the CPU 54, the code information representing the symbol "ANS" in addition to the results of the second calculation is admitted to the display 53 through the display buffer 60. The counter 59 has counted up to have the serial number "2" representing the serial number of the second algebraical equation and the results by the calculation. The contents of the counter 59 are entered to the display 53 through the display buffer 60. Hence, the display 53 shows the indication as follows:

ANS 2= ...

In accordance with the present invention, in addition to the results of calculation, the symbol "ANS" representing the results and the serial number of the results are pointed out in the display 53.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A display device for an electronic calculator for calculating a result according to a predetermined algebraic equation stored therein, comprising:
   means for storing at least two types of algebraic expressions which are entered externally;
   means responsive to the storing means for detecting a space which separates the two algebraic expressions;
   means responsive to the detecting means for terminating a first indication of data representing the first algebraic expression just before the position of the space; and means responsive to the detecting means for initiating a second indication of data representing the second algebraic expression following the space.

2. The display device as set forth in claim 1, wherein the terminating means comprises a circuit for storing a particular address which is the last address capable of being indicated in the display.

3. The display device as set forth in claim 1, wherein the initiating means comprises a circuit for storing a particular address which is the first address capable of being indicated in a display.

4. The display device as set forth in claim 1, which further comprises means responsive to the storing means for containing the number of steps of the at least two types of algebraic expressions.

5. The display device as set forth in claim 1, which further comprises a display responsive to the terminating means and the initiating means for identifying the first indication and the second indication, respectively.

6. The display device as set forth in claim 5, wherein the display comprises means for indicating the presence of an additional algebraic expression adjacent to a particular algebraic expression which is to be indicated in the display.

7. The display device as set forth in claim 5, which further comprises means connected to the display for counting the number of items which are to be indicated in the display.

8. The display device as set forth in claim 5, which further comprises means connected to the display for being activated to memorize that the display is operated to indicate particular items.

9. The display device as set forth in claim 8, wherein the memorizing means comprises a flip flop means.

10. A display device adapted for an electronic calculator calculating according to a predetermined algebraic equation stored therein, comprising:

means for storing at least two types of algebraic expressions which are entered externally;

means responsive to the storing means for detecting a separation mark between the at least two types of algebraic expressions;

means responsive to the detecting means for counting the serial number of the separation mark;

means responsive to the counting means for displaying the serial number of the separation mark in addition to the results of calculation obtained by one of the algebraical equations.

11. The display device as set forth in claim 10, which further comprises a mode selection switch actuated for selecting one from a first mode wherein the storing means is operated to store the at least two types of algebraic expressions, and a second mode wherein the electronic calculator is adapted to calculate according to the at least two types of algebraic expressions.

12. The display device as set forth in claim 10, which further comprises means for generating information representing a symbol meaning that the results of a calculation are presently indicated, and the generating means is coupled to the displaying means such that the displaying means indicates the serial number of the separation mark, the results of a calculation, and the symbol.

* * * * *